(12) United States Patent
Rajaram et al.

(10) Patent No.: US 9,047,606 B2
(45) Date of Patent: Jun. 2, 2015

(54) SOCIAL AND CONTEXTUAL RECOMMENDATIONS

(75) Inventors: Shyam Sundar Rajaram, San Francisco, CA (US); Rajan Lukose, Oakland, CA (US); Martin B Scholz, San Francisco, CA (US); Craig Peter Sayers, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 289 days.

(21) Appl. No.: 13/248,706

(22) Filed: Sep. 29, 2011

(65) Prior Publication Data

US 2013/0086160 A1    Apr. 4, 2013

(51) Int. Cl.
*G06Q 30/00* (2012.01)
*G06Q 50/00* (2012.01)
*H04L 12/58* (2006.01)
*G06Q 30/02* (2012.01)

(52) U.S. Cl.
CPC ............ *G06Q 30/00* (2013.01); *H04L 51/32* (2013.01); *G06Q 30/02* (2013.01); *G06Q 50/01* (2013.01)

(58) Field of Classification Search
USPC ........................................................ 709/204
See application file for complete search history.

(56) References Cited

U.S. PATENT DOCUMENTS

| 7,165,220 | B1  |   | 1/2007 | Bates |   |
|---|---|---|---|---|---|
| 7,570,943 | B2 |   | 8/2009 | Sorvari et al. |   |
| 7,881,938 | B2 |   | 2/2011 | Muschett et al. |   |
| 8,117,080 | B1 | * | 2/2012 | Ban et al. | 705/26.1 |
| 2004/0034637 | A1 |   | 2/2004 | Riche |   |
| 2006/0059225 | A1 |   | 3/2006 | Stonehocker et al. |   |
| 2006/0230058 | A1 |   | 10/2006 | Morris |   |
| 2008/0172364 | A1 |   | 7/2008 | Cucerzan et al. |   |
| 2008/0177858 | A1 |   | 7/2008 | Aarnio |   |
| 2008/0235680 | A1 |   | 9/2008 | Strauss et al. |   |
| 2008/0240379 | A1 |   | 10/2008 | Maislos et al. |   |
| 2008/0255946 | A1 | * | 10/2008 | Altberg et al. | 705/14 |
| 2008/0270561 | A1 |   | 10/2008 | Tang et al. |   |
| 2008/0282198 | A1 |   | 11/2008 | Brooks et al. |   |
| 2009/0006442 | A1 |   | 1/2009 | Anderson et al. |   |
| 2009/0037355 | A1 |   | 2/2009 | Brave et al. |   |
| 2009/0070360 | A1 |   | 3/2009 | Lyle |   |
| 2009/0125588 | A1 | * | 5/2009 | Black et al. | 709/204 |
| 2009/0163183 | A1 | * | 6/2009 | O'Donoghue et al. | 455/414.1 |
| 2010/0088100 | A1 |   | 4/2010 | Lindahl |   |
| 2010/0088372 | A1 | * | 4/2010 | Shridhar et al. | 709/204 |

(Continued)

FOREIGN PATENT DOCUMENTS

| JP | 2006023860 | 1/2006 |
|---|---|---|
| JP | 2009129298 | 6/2009 |
| KR | 20090000232 | 1/2009 |

OTHER PUBLICATIONS

Marshall Kirkpatrick : "Discovering Great Iphone Apps: 5 Recommendation Services Compared" Nov. 3, 2009, online.

*Primary Examiner* — Hamza Algibhah
*Assistant Examiner* — James Edwards
(74) *Attorney, Agent, or Firm* — Hewlett-Packard Patent Department

(57) ABSTRACT

A method performed by a processing system includes receiving a recommendation from a source user in response to performing an action corresponding to an action context of the recommendation, determining whether the source user appears in social network information of a target user, and distinguishing a presentation of the recommendation to the target user in response to the source user appearing in the social network information of the target user.

21 Claims, 6 Drawing Sheets

(56) References Cited

U.S. PATENT DOCUMENTS

| | | |
|---|---|---|
| 2010/0114907 A1 | 5/2010 | Kirby |
| 2010/0169153 A1 | 7/2010 | Hwacinski et al. |
| 2010/0251280 A1 | 9/2010 | Sofos et al. |
| 2010/0312724 A1* | 12/2010 | Pinckney et al. ............ 706/11 |
| 2011/0219073 A1* | 9/2011 | Lawler et al. ............ 709/204 |
| 2012/0158477 A1* | 6/2012 | Tennenholtz et al. ...... 705/14.19 |
| 2012/0203846 A1* | 8/2012 | Hull et al. .................... 709/206 |
| 2012/0265827 A9* | 10/2012 | Hansson et al. ............. 709/206 |
| 2013/0282828 A1* | 10/2013 | Lawler et al. ................ 709/204 |
| 2013/0304731 A1* | 11/2013 | Zheng et al. .................. 707/728 |
| 2014/0025449 A1* | 1/2014 | Abifaker ..................... 705/14.16 |
| 2014/0108540 A1* | 4/2014 | Crawford ..................... 709/204 |
| 2014/0245382 A1* | 8/2014 | Pannu et al. ..................... 726/1 |

* cited by examiner

SOCIAL AND CONTEXTUAL RECOMMENDATIONS

BACKGROUND

Processing systems, such as computers and smartphones, generally provide various methods in which a user can transmit information to another user. Examples of methods for transmitting information include email, text and/or multimedia messaging, and audio and/or video teleconferencing. At least some of these transmission methods, however, may provide information to a user at a time when the user is not in the best position to consider or act on the information. As a result, the user may be less attentive or receptive to the information when it is received than the user would be if the information was received at a more suitable time. In addition, many transmission methods allow users to receive unsolicited information from unknown users. Examples of unsolicited information include spam (i.e., unsolicited emails) and telemarketing phone calls or text messages. Many users find such information distracting and undesirable.

DETAILED DESCRIPTION

Figure 1:
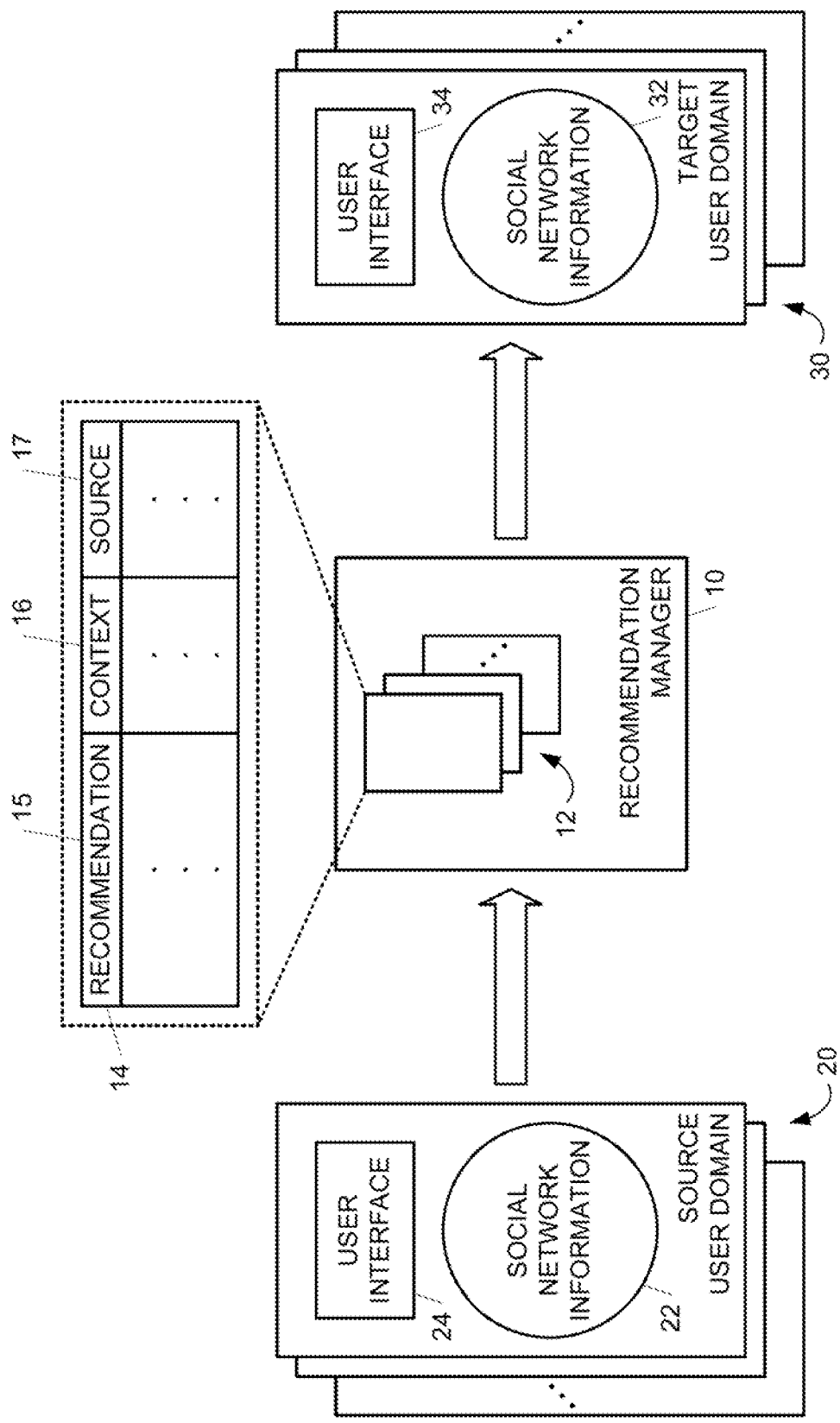
FIG. 1 is a block diagram illustrating one embodiment of a social and contextual recommendation environment that uses social network information.

In the following detailed description, reference is made to the accompanying drawings, which form a part hereof, and in which is shown by way of illustration specific embodiments in which the disclosed subject matter may be practiced. It is to be understood that other embodiments may be utilized and structural or logical changes may be made without departing from the scope of the present disclosure. The following detailed description, therefore, is not to be taken in a limiting sense, and the scope of the present disclosure is defined by the appended claims.

As used herein, a user of a processing system who generates a recommendation is referred to herein as a source user, and a user of a processing system for whom a recommendation is generated by the source user is referred to herein as a target user.

The term recommendation refers to a reference from a source user that is designated for receipt by a target user or users. The reference may be to a good (e.g., a software application (also referred to as an app), a book, a song, or a movie), a service (e.g., a restaurant or an artistic performance), a source of information (e.g., a website, a newspaper, or a television broadcast), a place of interest, and/or any other suitable item or information that the source user may wish to bring to the attention of a target user or users.

The term contextual recommendation refers to a recommendation that is configured to be provided to a target user in response to the target user performing a set of one or more actions defined by an action context corresponding to the recommendation. Examples of actions that may be defined by an action context include executing a computer program (e.g., an app) on a processing system (e.g., an app that presents an app store), accessing a website (e.g., an app store website), performing a function on a website (e.g., performing a search), accessing information from a storage system (e.g., an audio and/or video file stored on a local computer system, a remote computer system, or in a cloud of computer systems), arriving at or leaving a physical location (e.g., a bookstore), completing a task, and not performing a task within a certain time.

The term action context refers to information that defines a set of actions that may be performed by a target user, where the set of actions includes a number of actions that is greater than or equal to one (e.g., the set could include a combination of actions such as leaving an area without having run a particular app). The action context is used by a recommendation manager to determine when to provide a contextual recommendation to a target user. In particular, a recommendation manager provides a contextual recommendation to a target user in response to determining that the target user has performed the set of actions defined by the action context.

As shown and described herein, a social and contextual recommendation execution environment is provided that uses social network information to determine how to present recommendations from a source user of a processing system to a target user of the same or a different processing system in context (i.e., in response to the target user performing a set of actions defined by an action context of the recommendation). In particular, the environment presents contextual recommendations to a target user in a manner that distinguishes recommendations from source users that are in a social network of the target user (i.e., social recommendations). The recommendations may be distinguished by preventing the presentation of other recommendations from source users that are not in a social network of the target user (i.e., non-social recommendations) or by emphasizing the presentation of social recommendations with respect to non-social recommendations.

By providing the recommendations in context, the execution environment may increase the likelihood that a recommendation will be provided to a target user at a suitable time for the target user to act on the recommendation. In addition, the social aspect of the environment may increase the likelihood that the target user will find a recommendation to be valuable based on an increased likelihood of shared or overlapping interests between the target user and source users that are in a social network of the target user. Further, the environment may prevent unsolicited recommendations (i.e., recommendations from source users that are not in a social network of a target user) from being presented to a target user.

FIG. 1 is a block diagram illustrating one embodiment of a social and contextual recommendation execution environment 2 that uses social network information 32 of a target user and/or social network information 22 of a source user in the process of presenting contextual recommendations to the target user. Environment 2 includes a recommendation manager 10, a set of one or more source user domains 20 of source users, and a set of one or more target user domains 30 of target users. Environment 2 may be implemented using one or more processing systems (e.g., a processing system 100 shown in FIG. 6 and described in additional detail below) in any suitable configuration (e.g., a system configuration 200 shown in FIG. 7 and described in additional detail below).

Recommendation manager 10 stores a set 12 of zero or more contextual recommendations 14 for target users of corresponding target domains 30. Each contextual recommendation 14 includes a recommendation 15, an action context 16, and source information 17. Recommendation manager 10 receives recommendations 15 from source user domains 20 of source users where each recommendation 15 is designated for receipt by one or more target users of one or more target domains 30. For each recommendation 15, recommendation manager 10 receives, identifies, or otherwise determines an action context 16 and stores the action context 16 along with source information 17 that identifies a source user of the recommendation 15. Recommendation manager 10 provides each recommendation 15 to the target user domain 30 of the target user in response to a set of actions defined by the corresponding action context 16 being performed by the target user. In one embodiment, recommendation manager 10 also provides source information 17 for each recommendation 15 to the target user domain 30 of the target user. In other embodiments, recommendation manager 10 provides recommendations 15 to target user domains 30 in another suitable format that allows recommendations 15 from source users that are in a social network of the target user to be identified.

Each recommendation 15 includes any suitable information that includes or identifies a reference from a source user that is designated for receipt by a target user or users. Recommendation manager 10 may store each recommendation 15 in one or more formats that are processable by a target user domain 30 to allow the target user domain 30 to present the recommendation 15 to a target user in a format that is suitable for the target user domain 30.

Each action context 16 includes any suitable information that defines a set of actions that may be performed by a target user. Recommendation manager 10 monitors, detects, and/or receives notifications of actions performed by target users. When an action or actions of a target user match the set of actions defined by an action context 16 of a recommendation 15 for the target user, recommendation manager 10 provides the recommendation 15 to the target user domain 30 of the target user.

Each source information 17 includes any suitable information that identifies a source user for a corresponding recommendation 15. For example, source information 17 may include one or more of a name, address, telephone number, email address, processing device user name, social network user name, or other suitable identifying information that may be used to match information in social network information 22 and/or social network information 32. Recommendation manager 10 provides source information 17 to a target user domain 30 along with a corresponding recommendation 15 in one embodiment to allow the target user domain 30 to determine whether the source user appears in a social network of the target user using social network information 32.

Source user domains 20 allow corresponding source users to generate recommendations 15 for target users and provide the recommendations 15 along with source information 17 to recommendation manager 10. Source user domains 20 may also provide action contexts 16 corresponding to the recommendations 15 to recommendation manager 10. Each source user domain 20 corresponds to a different source user.

Each source user domain 20 includes social network information 22 of a corresponding source user and is configured to provide a user interface 24 that allows the source user to generate recommendations 15 for one or more target users. The user interface 24 may be implemented by a web browser or another suitable computer program that interacts with recommendation manager 10, for example. User interface 24 may access social network information 22 to assist the source user with selecting one or more target users. In some embodiments, user interface 24 and/or recommendation manager 10 may limit the set of possible target users to only those target users that appear in social network information 22 of the source user. In other words, user interface 24 and/or recommendation manager 10 may prevent the source user from making recommendations to users who are not in social network 22. For example, user interface 24 may list only potential target users that appear in social network 22 for selection by the source user. In other embodiments, recommendation manager 10 may access social network information 22 in source user domain 20 or other social network information stored elsewhere (not shown) to ensure that target users appear in social network information 22 before accepting and/or storing recommendations 15 for the target users.

Target user domains 30 receive and present recommendations 15 to corresponding target users in context. Target user domains 30 may provide information regarding target user activities to recommendation manager 10 to allow recommendation manager 10 to determine when a target user performs certain actions. Target user domains 30 receive recommendations 15 from recommendation manager 10 when actions that match action contexts 16 are performed by corresponding target users. Each target user domain 30 corresponds to a different target user.

Each target user domain 30 includes social network information 32 of a corresponding target user and a user interface 34 that allows recommendations 15 to be displayed to the target user. In embodiments where target user domains 30 receive source information 17 for each recommendation 15, target user domains 30 compare source information 17 to social network information 32 to determine whether the source users appears in social networks of corresponding target users. In other embodiments, target user domain 30 uses a format of recommendations 15 provided by recommendation manager 10 to determine whether source users are in a social network of corresponding target users.

Target user domains 30 presents contextual recommendations to target users in a manner that distinguishes social recommendations 15 (i.e., recommendations 15 from source users that are in a social network of the target user) from non-social recommendations 15 (i.e., recommendations 15 from source users that are in a social network of the target user) using user interface 34. Target user domains 30 may distinguish recommendations 15 by preventing the presentation of non-social recommendations in user interface 34 or by emphasizing the presentation of social recommendations 15 with respect to non-social recommendations 15 in user interface 34.

Figure 2:
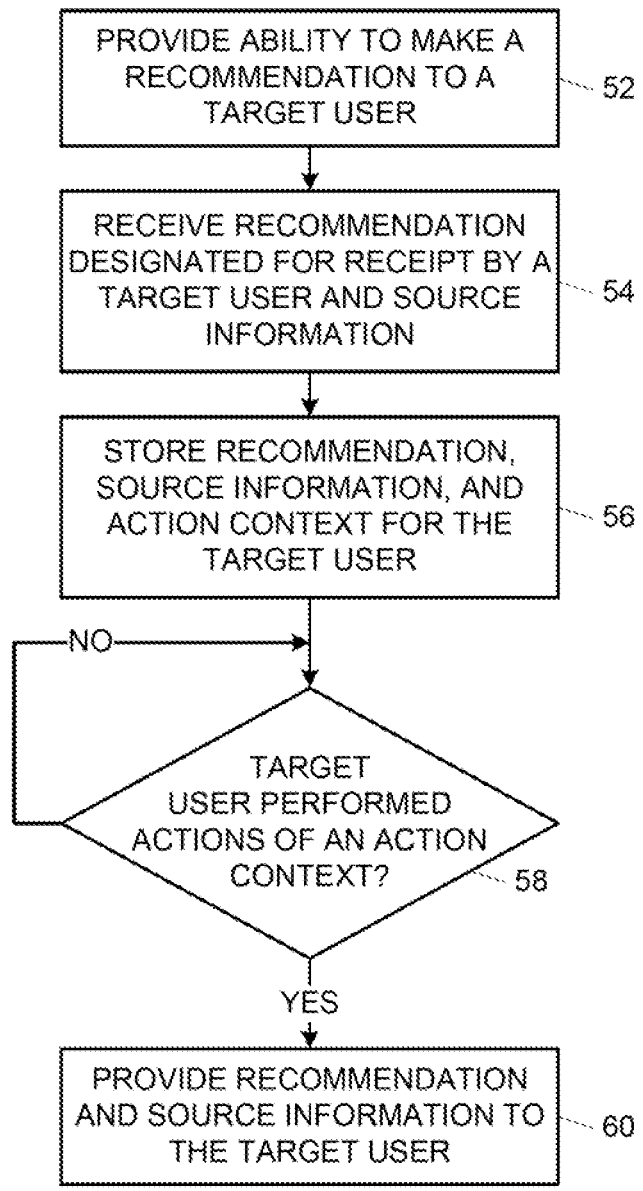
FIG. 2 is a flowchart illustrating one embodiment of a method for providing contextual recommendations from a source user to a target user.

Additional details of the operations of one embodiment of recommendation manager 10 will now be described with reference to FIG. 2. FIG. 2 is a flowchart illustrating one embodiment of a method for providing contextual recommendations from a source user to a target user.

In the embodiment of FIG. 2, recommendation manager 10 provides an ability to make a recommendation 15 to a target user as indicated in a block 52. Recommendation manager 10 provides the ability to make a recommendation 15 by being configured to receive recommendations 15 generated by source user domains 20 along with action contexts 16 and/or source information 17. The user interfaces 24 of source user domains 20 are configured to generate suitable prompts that allow source users to enter recommendations 15 and target users. The user interfaces 24 may generate the prompts responsive to a computer program stored on the user domain (e.g., an app) or as part of a web browser that receives all or a portion of the information used to generate the prompts from recommendation manager 10. The user interface 24 causes entered recommendations 15, source user information 17, and target user information to be provided to recommendation manager 10. The user interface 24 may also allow source users to explicitly enter action contexts 16. Thus, user interface 24 may also cause action contexts 16 entered by source users to be provided to recommendation manager 10.

Recommendation manager 10 receives a recommendation 15 designated by the source user for receipt by a target user or users and source information 17 from source user domains 20 as indicated in a block 54 and stores the recommendation 15, source information 17, and an action context 16 for the target user or users as indicated in a block 56. Recommendation manager 10 stores the recommendation 15, source information 17, and an action context 16 regardless of whether the source user appears in social network information 32 of the target user. In other words, recommendation manager 10 does not determine whether the source user appears in social network information 32 of the target user as a condition of storing recommendations 15 or providing recommendations 15 to a target user domain 30.

A determination is made by recommendation manager 10 as to whether a target user has performed a set of actions that corresponds to an action context 16 as indicated in a block 58. Recommendation manager 10 determines that the actions have been performed in response to receiving information from a corresponding target user domain 30 or another processing or storage system (not shown), such as a server that manages a website accessed by a target user or a storage system where the target user accesses audio and/or video content. The information may indicate, for example, that a computer program (e.g., an app) has been executed on the target user domain 30, that a website has been accessed by the target user domain 30, that the target user has performed a function on a website using the target user domain 30, that the target user accessed information from a storage system using the target user domain 30, that the target user arrived at or left a physical location with the target user domain 30 (i.e., the information includes GPS coordinates determined by the target user domain 30), that the target user completed a task with target user domain 30, or that the target user did not perform a task within a certain time with target user domain 30.

Any time that recommendation manager 10 determines that a target user has performed a set of actions that corresponds to an action context 16 of a recommendation 15, recommendation manager 10 provides the recommendation 15 and corresponding source information 17 to the target user domain 30 of the target user as indicated in a block 60. Recommendation manager 10 continues to maintain each remaining recommendation 15 for the target user until the actions defined by the corresponding action contexts 16 are performed.

In some embodiments, recommendation manager 10 may also prevent recommendations 15 from being provided to target users where the target user does not appear in the social network information 22 of the source user. To do so, recommendation manager 10 causes source user domain 20 to compare the target user to social network information 22 to verify that the target user is in social network information 22 before accepting and storing a recommendation 15 for the target user from the source user of the source user domain.

In addition, recommendation manager 10 may also provide a notification to a target user that a recommendation 15 has been received and will be delivered in response to the actions corresponding to the action context 16 being performed. The notification could be made by sending an email, text message, instant message, social media message, or other suitable message and may include a mode that allows for immediate performance of the actions corresponding to the action context 16 of the recommendation 15. For example, recommendation manager 10 may notify a target user by sending an email to indicate that a source user has recommended a particular app from an app store and including a link in the email that allows the target user to visit the app store (i.e., access the app store using target user domain 30).

Figure 3:
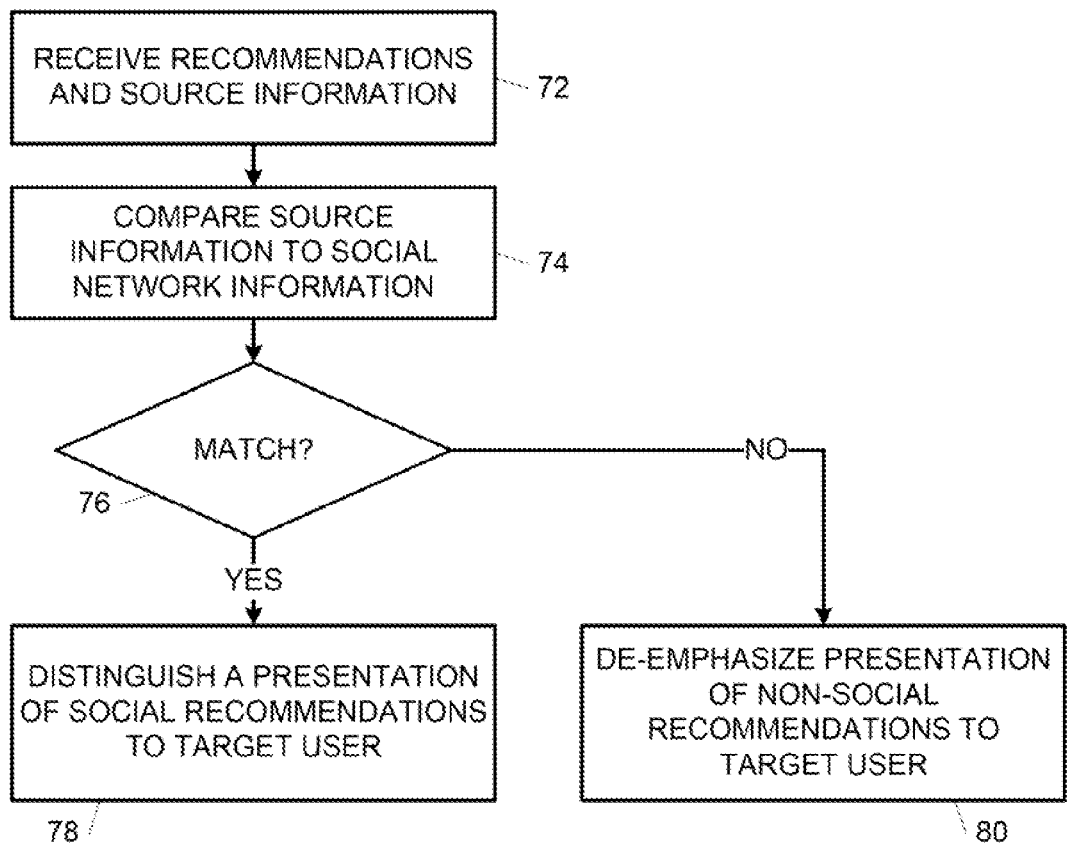
FIG. 3 is a flowchart illustrating one embodiment of a method for presenting recommendations to a target user using social network information.
Figure 4:
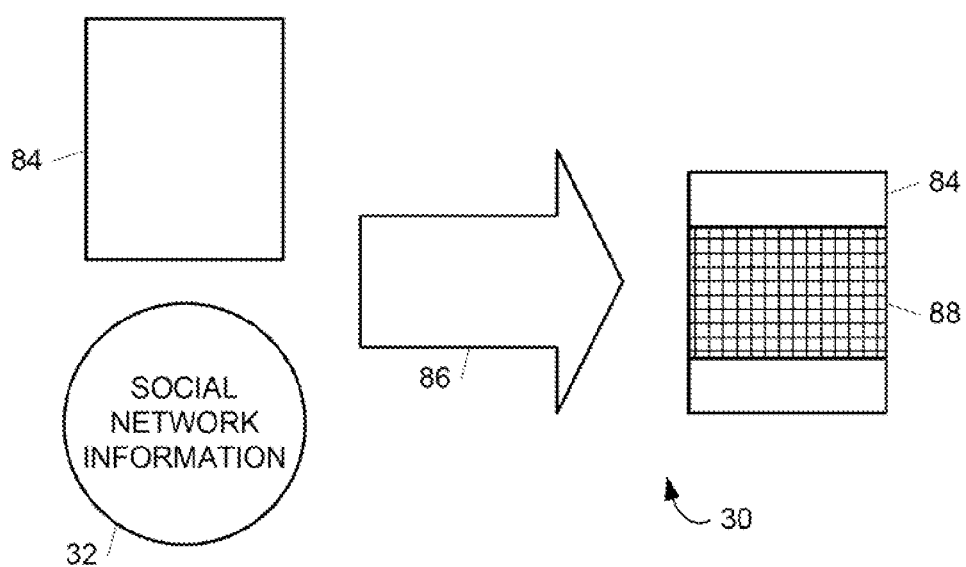
FIG. 4 is a block diagram illustrating one embodiment of comparing source information of recommendations to social network information of a target user.
Figure 5A:
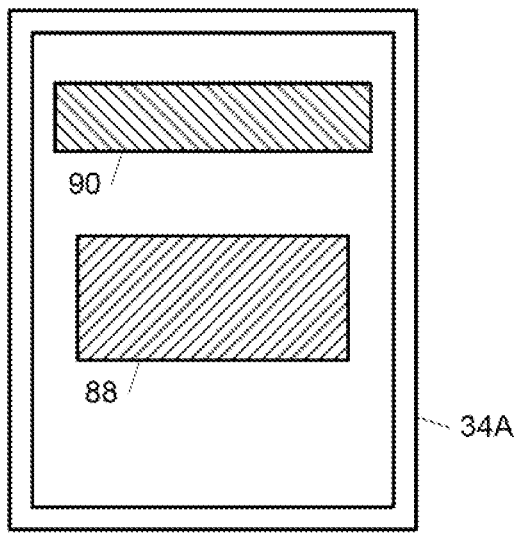
FIGS. 5A-5B are block diagrams illustrating embodiments of presentations of recommendations to a target user in a user interface.
Figure 5B:
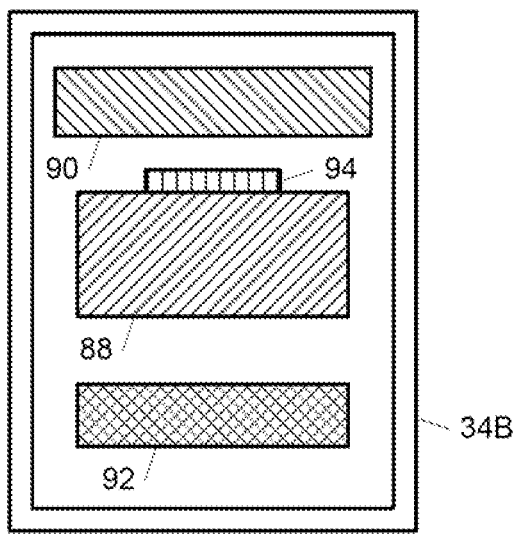

Additional details of the operations of one embodiment of target user domain 30 will now be described with reference to FIGS. 3, 4, and 5A-5B. FIG. 3 is a flowchart illustrating one embodiment of a method for presenting recommendations 15 to a target user using social network information 32. FIG. 4 is a block diagram illustrating one embodiment of comparing source information 17 of recommendations 15 to social network information 32 of a target user. FIGS. 5A-5B are block diagrams illustrating embodiments of presentations of recommendations 15 to a target user in user interface 34.

In the embodiment of FIGS. 3 and 4, target user domain 30 receives a set 84 of one or more recommendations 15 and source information 17 from recommendation manager 10 as indicated in a block 72. As described above, the set 84 of recommendations 15 are received in response to recommendations manager 10 determining that the actions defined by the corresponding action contexts have been performed by the target user using the target user domain 30. Target user domain 30 determines whether source users appear in social network information 32 of the target user by comparing source information 17 of each recommendation 15 in set 84 to social network information 32 as indicated in a block 74 in FIG. 3 and by an arrow 86 in FIG. 4. By doing so, target user domain 30 identifies a subset 88 of zero or more recommendations 15 that correspond to source users that are in the social network of the target user.

As indicated by blocks 76, 78, and 80, target user domain 30 distinguishes the presentation of social recommendations 15 (i.e., those recommendations 15 in subset 88) to the target user using user interface 34 and de-emphasizes the presentation of non-social recommendations 15 (i.e., those recommendations 15 in set 84 but not subset 88). As noted above, user interface 34 may distinguish the presentation of social recommendations 15 and de-emphasizes the presentation of non-social recommendations 15 by preventing the display of non-social recommendations. In FIG. 5A, for example, a user interface 34A may display information 90 that describes the context of recommendations (e.g., the banner of an app store where app recommendations are provided) and the social recommendations 15 in subset 88. The display of the social recommendations 15 may include an identifier of the source user for each recommendation 15 (not shown).

User interface 34 may also distinguish the presentation of social recommendations 15 and de-emphasizes the presentation of non-social recommendations 15 by emphasizing the presentation of social recommendations 15 with respect to non-social recommendations 15. In FIG. 5B, for example, a user interface 34B may display both the social recommendations 15 in subset 88 and the non-social recommendations 15 shown in a block 92. User interface 34B, however, emphasizes the social recommendations 15 over the non-social recommendations 15 by listing social recommendations 15 first, adding a social recommendation designator 94 to note the social nature of social recommendations 15, displaying social recommendations 15 with a larger size or more prominent position, or providing other distinguishing features for social recommendations 15. The display of the social recommendations 15 may include an identifier of the source user for each recommendation 15 (not shown).

User interface 34 may provide the target user with the ability to select recommendations 15 to access additional information regarding the recommendations. For example, user interface 34 may present the recommendations 15 as links to product web pages or other sources of information. User interface 34 may also rank recommendations 15 based on the number of recommendations of a particular recommendation 15 by source users, by the amount or frequency of communication between the target user and the source users, by similarity of interested between the target user and the source users, and/or a history of successful recommendations from the source user.

A target user may also be provided with the ability to block recommendations from selected source users in user interface 34. To do so, user interface 34 provides a target user with the ability to enter a block request. User interface 34 may either store the block request and prevent recommendations 15 from blocked source users from being displayed or provide the block request to recommendation manager 10 to prevent recommendations 15 from blocked source users from being provided to target user domain 30.

Figure 6:
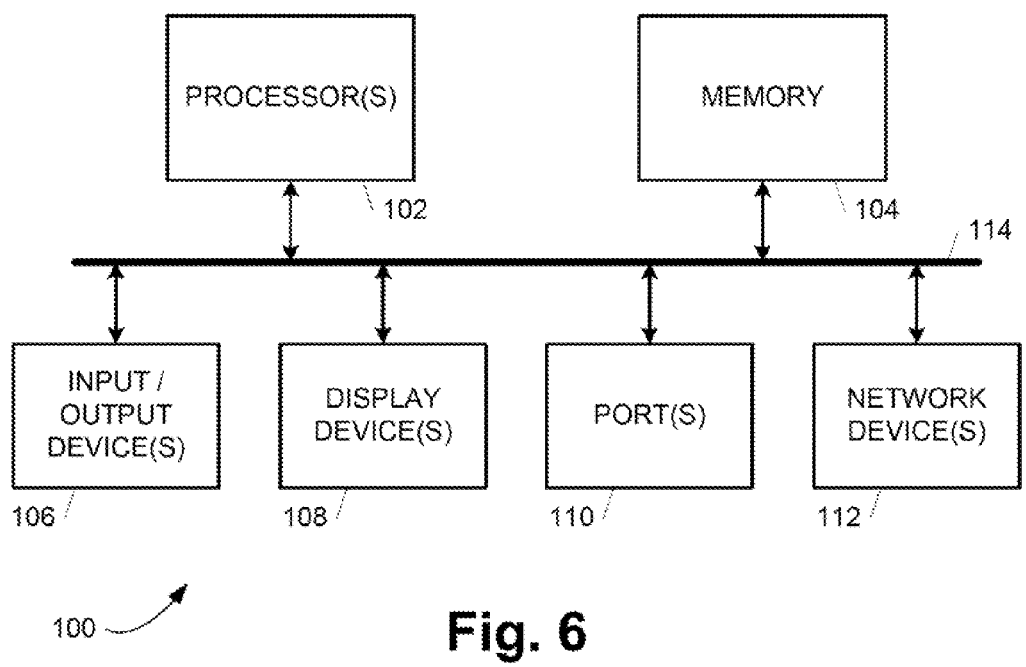
FIG. 6 is a block diagram illustrating a processing system configured to implement a recommendation manager and/or one or more user domains from a social and contextual recommendation execution environment.

FIG. 6 is a block diagram illustrating a processing system 100 configured to implement recommendation manager 10 and/or user domains 20 and/or 30 in social and contextual recommendation execution environment 2 shown in FIG. 1.

Processing system 100 includes at least one processor 102 configured to execute machine readable instructions stored in a memory system 104. Processing system 100 may also include any suitable number of input/output devices 106, display devices 108, ports 110, and/or network devices 112. Processors 102, memory system 104, input/output devices 106, display devices 108, ports 110, and network devices 112 communicate using a set of interconnections 114 that includes any suitable type, number, and/or configuration of controllers, buses, interfaces, and/or other wired or wireless connections. Components of processing system 100 (for example, processors 102, memory system 104, input/output devices 106, display devices 108, ports 110, network devices 112, and interconnections 112) may be contained in a common housing (not shown) or in any suitable number of separate housings (not shown).

Processing system 100 may execute a basic input output system (BIOS), firmware, an operating system, a runtime execution environment, and/or other services and/or applications stored in memory 104 (not shown) that includes machine readable instructions that are executable by processors 102 to manage the components of processing system 100 and provide a set of functions that allow other programs (e.g., recommendation manager 10, user domain 20, and user domain 30) to access and use the components.

Processing system 100 represents any suitable processing device, or portion of a processing device, configured to implement the functions of recommendation manager 10, user domain 20, and/or user domain 30 as described above. A processing device may be a laptop computer, a tablet computer, a desktop computer, a server, or another suitable type of computer system. A processing device may also be a mobile telephone with processing capabilities (i.e., a smart phone), a digital still and/or video camera, a personal digital assistant (PDA), an audio/video device, or another suitable type of electronic device with processing capabilities. Processing capabilities refer to the ability of a device to execute instructions stored in a memory 104 with at least one processor 102.

Each processor 102 is configured to access and execute instructions stored in memory system 104. Each processor 102 may execute the instructions in conjunction with or in response to information received from input/output devices 106, display devices 108, ports 110, and/or network devices 112. Each processor 102 is also configured to access and store data in memory system 104.

Memory system 104 includes any suitable type, number, and configuration of volatile or non-volatile storage devices configured to store instructions and data. The storage devices of memory system 104 represent computer readable storage media that store computer-readable and computer-executable instructions including recommendation manager 10, user domain 20, and/or user domain 30. Memory system 104 stores instructions and data received from processors 102, input/output devices 106, display devices 108, ports 110, and network devices 112. Memory system 104 provides stored instructions and data to processors 102, input/output devices 106, display devices 108, ports 110, and network devices 112. The instructions are executable by processing system 100 to perform the functions and methods of recommendation manager 10, user domain 20, and user domain 30 described herein. Examples of storage devices in memory system 104 include hard disk drives, random access memory (RAM), read only memory (ROM), flash memory drives and cards, and other suitable types of magnetic and/or optical disks.

Input/output devices 106 include any suitable type, number, and configuration of input/output devices configured to input instructions and/or data from a user to processing system 100 and output instructions and/or data from processing system 100 to the user. Examples of input/output devices 106 include a touchscreen, buttons, dials, knobs, switches, a keyboard, a mouse, and a touchpad.

Display devices 108 include any suitable type, number, and configuration of display devices configured to output image, textual, and/or graphical information to a user of processing system 100. Examples of display devices 108 include a display screen, a monitor, and a projector. Display devices 108 may be configured to display user interfaces 24 and /34.

Ports 110 include suitable type, number, and configuration of ports configured to input instructions and/or data from another device (not shown) to processing system 100 and output instructions and/or data from processing system 100 to another device.

Network devices 112 include any suitable type, number, and/or configuration of network devices configured to allow processing system 100 to communicate across one or more wired or wireless networks (not shown). Network devices 112 may operate according to any suitable networking protocol and/or configuration to allow information to be transmitted by processing system 100 to a network or received by processing system 112 from a network.

Figure 7:
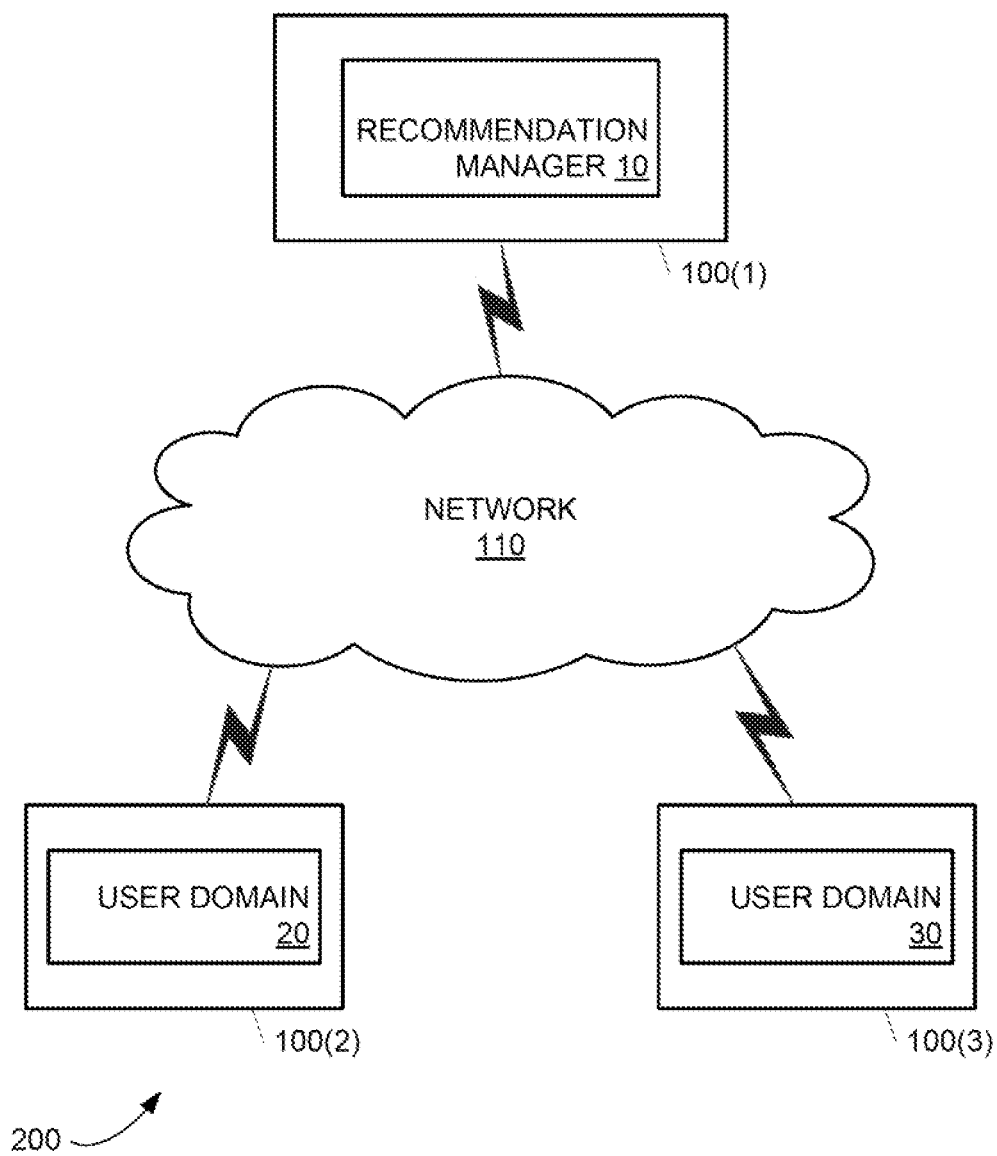
FIG. 7 is a block diagram illustrating a system configuration that implements the social and contextual recommendation execution environment shown in FIG. 1 with processing systems shown in FIG. 6.

FIG. 7 is a block diagram illustrating system configuration 200 that implements the social and contextual recommendation execution environment 2 shown in FIG. 1 with processing systems 100(1), 100(2), and 100(3) shown in FIG. 6. In the embodiment of FIG. 7, recommendation manager 10, source user domain 20, and target user domain 30 are implemented using processing systems 100(1), 100(2), and 100(3), respectively. Processing systems 100(1), 100(2), and 100(3) communicate with one another using a network 110 where network 110 includes any suitable type, number, and configuration of wired and/or wireless network devices (not shown). For example, network 110 may include the Internet and/or a wireless telecommunications network (e.g., a cellular network).

Additional source user domains 20 may also be implemented in processing systems 100(1) and/or 100(2) (not shown). In other words, processing systems 100(1) and 100(2) may also be configured to allow one or multiple source users to generate recommendations as described above. Similarly, additional target user domains 30 may also be implemented in processing systems 100(1) and/or 100(2) (not shown). In other words, processing systems 100(1) and 100(2) may also be configured to allow one or multiple target users to receive recommendations as described above.

In another embodiment (not shown), each of recommendation manager 10, source user domains 20, and target user domains 30 may be implemented in a single processing system 100. For example, a computer system in a retail environment may allow customers (i.e., source users) to log in, access their social network information 22, and provide recommendations 15 to others in their social network. Likewise, customers (i.e., target users) may receive social recommendations 15 in response to logging in and accessing their social network information 32.

In further embodiments, a processing system 100 may include recommendation manager 10 and only one of source user domains 20 or target user domains 30.

Although specific embodiments have been illustrated and described herein for purposes of description of the embodiments, it will be appreciated by those of ordinary skill in the art that a wide variety of alternate and/or equivalent implementations may be substituted for the specific embodiments shown and described without departing from the scope of the present disclosure. Those with skill in the art will readily appreciate that the present disclosure may be implemented in a very wide variety of embodiments. This application is intended to cover any adaptations or variations of the disclosed embodiments discussed herein. Therefore, it is manifestly intended that the scope of the present disclosure be limited by the claims and the equivalents thereof.

What is claimed is:

1. A non-transitory computer-readable storage medium storing instructions that, when executed by a processing system, perform a method comprising:
   receiving a first recommendation from a first source user in response to performing an action corresponding to a specified action context associated with the first recommendation;
   in response to receiving the first recommendation, determining, from source information accompanying the first recommendation, whether the first source user appears in social network information of a target user of the first recommendation; and
   presenting a first presentation of the first recommendation to the target user if the first source user is in the social network of the target user or presenting a second presentation of the first recommendation to the target user if the first source user is not in the social network of the target user, the second presentation being different than the first presentation such that the second presentation is indicative of the first source user not being in the social network and the first presentation is indicative of the first source user being in the social network.

2. The computer-readable storage medium of claim 1, the method further comprising:
   including an identifier of the first source user in the presentation of the first recommendation.

3. The computer-readable storage medium of claim 1, the method further comprising:
   wherein presenting the second presentation of the first recommendation comprises preventing the first recommendation from being presented to the target user in response to the first source user not appearing in the social network information of the target user.

4. The computer-readable storage medium of claim 1, the method further comprising:
   when the first source user appears in the social network information of the target user, distinguishing the presentation of the first recommendation by emphasizing the first recommendation with respect to a second recommendation from a second source user that does not appear in the social network information of the target user.

5. The computer-readable storage medium of claim 1, wherein the action includes at least one of executing a computer program, accessing a website, accessing information from a storage system, arriving at or leaving a physical location, completing a first task, or not performing a second task within a certain time.

6. The computer-readable storage medium of claim 1, wherein the social network information includes one of an address book or a contact list.

7. The computer-readable storage medium of claim 1, the method further comprising:
   providing the target user with an option to block a subsequent recommendation from the source user.

8. A method performed by at least one processing system, the method comprising:
   receiving a first recommendation from a first source user, the first recommendation being associated with an action context that defines one or more actions to be performed by a target user before the first recommendation is to be provided to that target user, the first recommendation further including a designation by the first source user of an identity of the target user;
   storing the first recommendation along with a specification of the corresponding action context, a specification of the target user, a first presentation of the first recommendation to be presented when the target user is associated with the first source user via a social network, and a second presentation of the recommendation to be presented when the target user is not associated with the first source user via the social network, the second presentation being different than the first presentation such that the second presentation is indicative of the first source user not being in the social network and the first presentation is indicative of the first source user being in the social network; and
   providing the first recommendation to the target user in response to detecting that an action corresponding to the action context has been performed by the target user.

9. The method of claim 8 further comprising:
   receiving a second recommendation from a second source user, the second recommendation designated by the second source user for receipt by the target user; and
   preventing the second recommendation from being provided to the target user in response to the target user not appearing in the social network of the second source user.

10. The method of claim 8 further comprising:
providing a notification to the target user that the first recommendation has been made prior to the target user performing the action or receiving the first recommendation.

11. The method of claim 10, further comprising:
providing a mechanism for the target user to immediately access the first recommendation based on the notification.

12. The method of claim 8 wherein the action includes at least one of executing a computer program, accessing a website, performing a function on a website, accessing information from a storage system, arriving at or leaving a physical location, completing a first task, or not performing a second task within a certain time.

13. The method of claim 8 wherein the first recommendation is for at least one of a good, a service, a source of information, or a place of interest.

14. The method of claim 8, further comprising storing the first recommendation in multiple formats to allow for providing the first recommendation to the target user in one of said multiple formats, a selected format being suited to a target user domain in which the target user is acting.

15. The method of claim 8, further comprising:
receiving information regarding target user activities from a target user domain; and
using the information regarding target user activities to determine whether the target user has performed the action corresponding to the action context.

16. A processing system comprising:
a memory storing a recommendation manager; and
at least one processor configured to execute the recommendation manager to:
determine that a target user has performed a set of actions that corresponds to an action context of a set of recommendations from a set of source users, wherein the action context defines one or more actions to be performed by the target user in order to trigger transmission of the corresponding set of recommendations to that target user, the action context being provided by a source user along with a designation of an identification of a target user to whom the corresponding set of recommendations will be transmitted in response to that target user performing the set of actions specified by the action context; and,
in response to receiving the indication that the target user performed the set of actions specified by the action context, provide the set of recommendations to the target user in a format that allows recommendations in the set of recommendations from source users in the set of source users that are in a social network of the target user to be identified by providing a first presentation for each of the recommendations to be presented when the target user is associated, via the social network, with a corresponding source user of each recommendation or a second presentation for each of the recommendations to be presented when the target user is not associated, via the social network, with the corresponding source user of each recommendation, the second presentation being different than the first presentation such that the second presentation is indicative of the first source user not being in the social network and the first presentation is indicative of the first source user being in the social network.

17. The system of claim 16 wherein the format includes source information for each recommendation in the set of recommendations.

18. The system of claim 16 wherein the processor configured to execute the recommendation manager to provide the set of source users with the ability to make the set of recommendations.

19. The system of claim 16 wherein the set of actions includes at least one of executing a computer program, accessing a website, performing a function on a website, accessing information from a storage system, arriving at or leaving a physical location, completing a first task, or not performing a second task within a certain time.

20. The system of claim 16 wherein at least one of the set of recommendations is for a good, a service, a source of information, or a place of interest.

21. A method performed by at least one processing system, the method comprising:
monitoring actions taken by a number of target users in a target user domain;
comparing said actions to a number of stored recommendations, each stored recommendation comprising a specification of a target user a specification of an action context that defines one or more actions to be performed by the specified target user before the corresponding recommendation is provided to the specified target user, a first presentation of the recommendation to be presented to the target user when the target user is associated with a source user via a social network, and a second presentation of the recommendation to be presented to the target user when the target user is not associated with the source user via the social network, the second presentation being different than the first presentation such that the second presentation is indicative of the first source user not being in the social network and the first presentation is indicative of the first source user being in the social network;
providing one of the number of the stored recommendations of the source user to the target user in response to the target user matching the specification of the target user of the stored recommendation and the target user performing a set of actions matching the action context of the stored recommendation.

* * * * *